United States Patent [19]

Brogie

[11] Patent Number: 4,520,603
[45] Date of Patent: Jun. 4, 1985

[54] AUTOMOBILE SHELTER

[76] Inventor: Earl W. Brogie, P.O. Box 336, Warrenville, Ill. 60555

[21] Appl. No.: 470,072

[22] Filed: Feb. 28, 1983

[51] Int. Cl.³ .............................................. E04H 14/00
[52] U.S. Cl. .................................... 52/173 R; 52/174; 123/142.5 R
[58] Field of Search ............... 52/174, 173 DS, 79.5, 52/173 R, 63, DIG. 14; 237/28; 123/142.5 R

[56] References Cited

U.S. PATENT DOCUMENTS

| | | | |
|---|---|---|---|
| 1,234,049 | 7/1917 | Lovell | 123/142.5 R X |
| 1,298,517 | 3/1919 | Koch | 123/142.5 R X |
| 1,322,036 | 11/1919 | Martin | 123/142.5 R X |
| 1,481,447 | 1/1924 | Weston | 123/142.5 R X |
| 1,560,320 | 11/1925 | Regenauer | |
| 2,282,324 | 5/1942 | Everitt | 52/174 X |
| 2,417,636 | 3/1947 | Ditzler et al. | 126/99 |
| 2,634,589 | 4/1953 | Wilson et al. | 62/102 |
| 3,093,259 | 6/1963 | Morrison | 52/69 X |
| 3,203,143 | 8/1965 | Swenson | 52/64 |
| 3,277,621 | 10/1966 | Merdich | 52/86 |
| 4,020,607 | 3/1977 | Bjervig | 52/173 |
| 4,228,622 | 10/1980 | Tiema | 52/63 X |
| 4,322,923 | 4/1982 | O'Neal | 52/2 |

FOREIGN PATENT DOCUMENTS 924871 5/1963 United Kingdom ................. 52/174

Primary Examiner—Carl D. Friedman

[57] ABSTRACT

An automobile shelter comprising a housing, the housing including a front portion having an opening therein and being adapted to receive an engine compartment portion of an automobile, a floor portion adapted to receive wheels of the automobile, side portions adapted to extend along either side of the automobile engine compartment, a roof portion adapted to overlie the automobile engine compartment, and a back portion enclosing one end of the housing, and a heat supply source connected to the housing and adapted to raise the ambient temperature of the automobile engine compartment.

11 Claims, 7 Drawing Figures

AUTOMOBILE SHELTER

BACKGROUND OF THE INVENTION

1. Field of the Invention

This invention relates to shelter structures and is directed more particularly to a shelter for an engine compartment portion of an automobile.

2. Description of the Prior Art

The external heating of aircraft internal combustion engines is known in the art. Inasmuch as aircraft are often parked in exposed areas, means have been provided for directing warm air into a compartment covering the engine portion of the aircraft. As disclosed in U.S. Pat. No. 2,417,636 to J. N. Ditzler et al, the compartment may comprise a flexible cover placed over the engine, with a duct extending from the cover to a portable heating unit.

In view of the costs involved in construction of garages, and/or a number of automobiles in a family exceeding the number of garage bays available, automobiles are often parked in exposed locations in driveways or car ports. After being so exposed overnight or longer, in cold climes, an operator may well experience difficulty in starting the engine. Various methods of combating the problem have included placing a lighted light bulb in the engine compartment, using an electrically heated dip stick, and other such make-shift arrangements. Another solution, the provision of a small-sized shelter just large enough to contain the automobile, is illustrated in U.S. Pat. No. 3,203,143 to O. J. Swenson.

SUMMARY OF THE INVENTION

An object of the present invention is to provide a shelter structure for enclosing the engine compartment portion of an automobile and supplying heat thereto.

With the above and other objects in view, as will hereinafter appear, a feature of the present invention is the provision of an automobile shelter comprising a housing, the housing including a front portion having an opening therein and being adapted to receive an engine compartment portion of an automobile, the front portion having means for fitting snugly about the automobile, a floor portion adapted to receive wheels of the automobile, side portions adapted to extend along either side of the automobile engine compartment, a roof portion adapted to overlie the automobile engine compartment, and a back portion enclosing one end of the housing, and a heat supply source connected to the housing and adapted to influence the ambient temperature within the housing, whereby to influence the temperature of the automobile engine compartment.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENT

Figure 1:
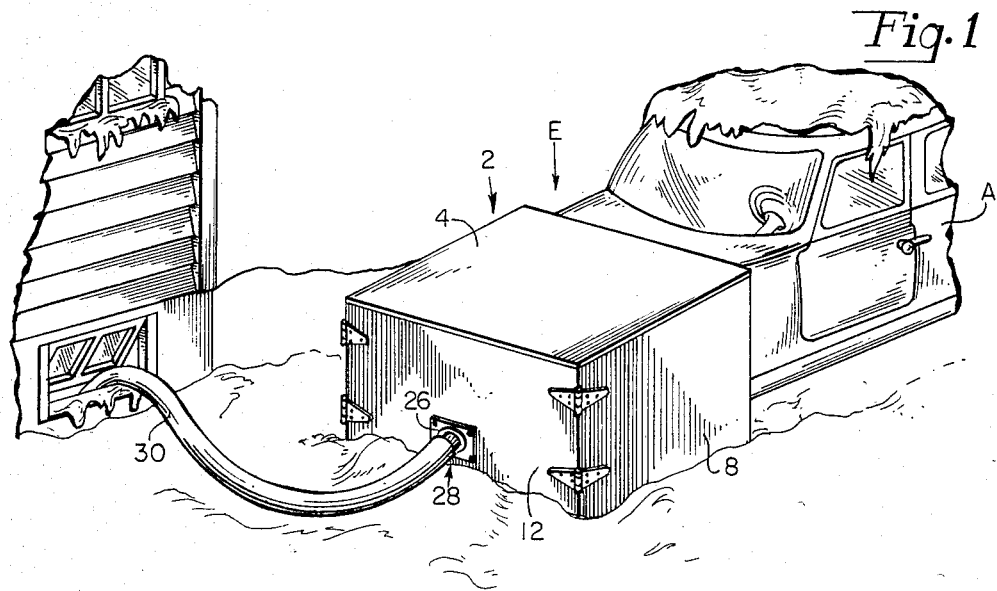
FIG. 1 is a perspective view of a shelter structure, shown in use.
Figure 2:
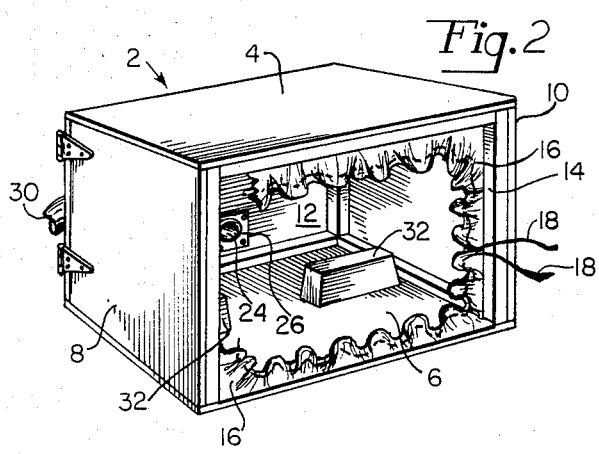
FIG. 2 is a further perspective view of the shelter shown in FIG. 1.

Referring to FIGS. 1 and 2, it will be seen that the illustrative shelter includes a housing 2 having a roof portion 4, a floor portion 6, side portions 8, 10, and a back portion 12. In the embodiment shown in FIGS. 1 and 2, the portions 4, 6, 8, 10, 12 each comprise a flat panel.

The housing 2 further includes a front portion 14 which is open and adapted to receive an engine compartment portion E of an automobile A. The front portion 14 includes a flexible material 16 which is adapted to be drawn snugly about the automobile A, as by a draw-string 18.

Figure 3:
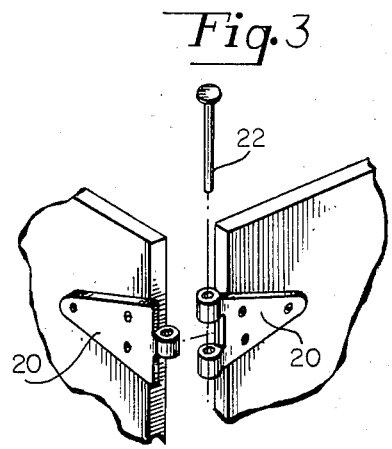
FIG. 3 is an enlarged, exploded, detailed view of a portion of the shelter of FIGS. 1 and 2.

The panels 4, 6, 8, 10 and 12 are fixed together in assembled relationship by fittings 20 and knock-out pins 22 (FIG. 3) by which the panels may be easily and quickly assembled and disassembled. When disassembled, the panels being flat, may be stacked one upon the other.

One of the panels, the back panel 12, as illustrated in FIGS. 1 and 2, is provided with an aperture 24 and collar 26 thereabout adapted to receive a first end 28 of a flexible conduit 30. The conduit 30 extends from the housing 2 to a source of warm air, as for example a household furnace disposed in a residence cellar, as illustrated in FIG. 1.

In operation, the engine compartment portion E of an automobile A, illustrated in the drawings as the front end, is received by the housing by way of the open front portion 14 of the housing. The automobile is moved into the housing until the wheels of the automobile come to rest against chock members 32 fixed to the floor panel 6. The flexible material 16 is drawn as by the draw-string 18, snugly about the automobile. Warm air from the residential cellar, or other selected warm location travels through the conduit member 30 and into the housing 2, influencing the ambient temperature of the air in the housing, and thereby influencing the temperature of the engine compartment E.

Figure 4:
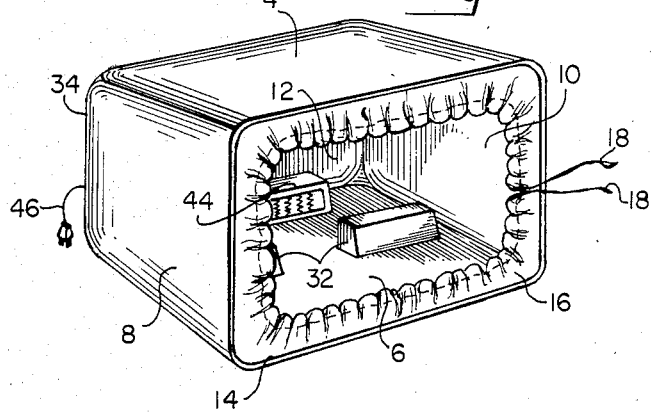
FIG. 4 is a perspective view of an alternative embodiment.
Figure 5:
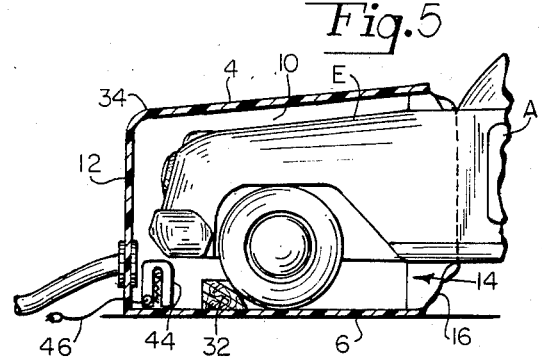
FIG. 5 is a cut-away view of the embodiment shown in FIG. 4, shown in use.
Figure 6:
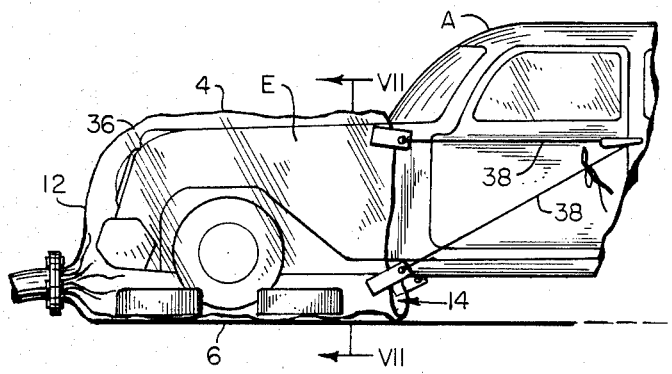
FIG. 6 is a side elevational view of another alternative embodiment, shown in operation.

As an alternative embodiment, shown in FIGS. 5 and 6, the roof portion 4, floor portion 6, side portions 8, 10 and back portion 12, comprise portions of a single formed housing member 34. Like the housing 2, the formed housing member 34 is provided with an open front portion 14 having the flexible material 16 and draw-string 18 arrangement. This alternative embodiment is used in the same manner as the FIGS. 1-2 embodiment. As in the first embodiment, the alternative embodiment of FIGS. 4 and 5 is preferably provided with chock members 32, either fixed to the floor portion 6, or formed integrally therewith.

Figure 7:
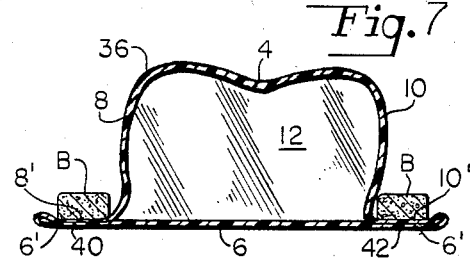
FIG. 7 is a sectional view of the shelter alone, taken along line 7—7 of FIG. 6.

In FIGS. 6 and 7 there is shown another alternative embodiment in which the roof portion 4, floor portion 6, side portions 8, 10 and back portion 12 comprise portions of a single flexible housing 36. Like the foregoing embodiments, the FIGS. 6 and 7 embodiment includes an open front portion 14. However, the flexible housing embodiment, being flexible at its opening, need not be provided with additional flexible material. Inasmuch as the flexible housing embodiment is not rigid, means, such as ties 38, may be provided to affix the housing 36 to the automobile A. In the flexible housing embodiment, the side and floor portions 6, 8, 10, may be provided with extended portions 6', 8', 10' by which may be formed flap portions 40, 42. Weights, such as bricks B, may be placed on the flap portions 40, 42.

If deemed necessary, any of the above embodiments may be provided with an additional or alternative heating source in the form of an electrical heater 44 (FIGS. 4 and 5), which may be a separate unit placed in the housing 2, 34, 36, or, in the case of the panel housing 2 and formed housing 34, may be fixed to a portion of the housing. If an electrical in-housing unit is used, an extension cord 46 may be utilized to convey electrical energy from a nearby residence, or the like, to the housing heater unit.

Thus, for a fraction of the cost of an ordinary automobile garage, the portion of an automobile most sensitive to exposure to the elements may be protected. The panel housing embodiment may be readily disassembled and stored during warm weather periods, and the flexible housing embodiment may be simply folded and placed in storage during warm weather periods.

It is to be understood that the present invention is by no means limited to the particular construction herein disclosed and/or shown in the drawings, but also comprises any modifications or equivalents within the scope of the disclosure.

For example, combinations of above embodiments may readily be contemplated, such as a panel floor portion in combination with a flexible housing, or a flexible housing retained by a frame structure, effectively rendering the housing semi-rigid. It will also be appreciated that while the above disclosure has related to automobiles for illustrative purposes, similar vehicles, such as trucks and vans, and the like, could be accommodated and would benefit in like measure.

Having thus described my invention what I claim as new and desire to secure by Letters Patent of the United States is:

1. An automobile shelter comprising a housing, said housing including a front portion having an opening therein and being adapted to receive an engine compartment portion of an automobile, said front portion having means for fitting snugly completely around said automobile, a floor portion adapted to receive wheels of said automobile engine compartment, a roof portion adapted to overlie said automobile engine compartment, and a back portion enclosing one end of said housing, and a heat supply source connected to said housing and adapted to influence the ambient temperature within said housing, whereby to influence the temperature of said automobile engine compartment, said floor, side and roof portions each being of a length extending from a point forward of, but proximate, a forward-most portion of said automobile to a point forward of, but proximate, the forward extent of a front windshield portion of said automobile.

2. The shelter in accordance with claim 1 in which said roof portion, floor portion, side portions and back portion each comprise a flat rigid panel.

3. The shelter in accordance with claim 2 in which said front portion comprises a flexible material forming said opening and extending inwardly from said floor, side and roof panels to be drawn snugly about said automobile.

4. The shelter in accordance with claim 2 in which said panels are fixed together by pins readily removable, whereby said panels may be disassembled and stacked.

5. The shelter in accordance with claim 1 in which said roof portion, floor portion, side portions and back portion comprise portions of a single formed member.

6. The shelter in accordance with claim 5 in which said front portion comprises a flexible material forming said opening and adapted to be drawn snugly about said automobile.

7. The shelter in accordance with claim 1 in which said roof portion, side portions and back portion comprise portions of a single flexible member.

8. The shelter in accordance with claim 1 in which a selected one of said portions is provided with an aperture therein and said heat supply source comprises an elongated flexible conduit member, adapted at an end thereof to be fixed in said aperture, the conduit member being adapted to extend to said housing from a selected source of heat.

9. The shelter in accordance with claim 1 in which said heat supply source comprises an electrical heater unit disposed in said housing, and an electrical cord extending from said housing, said cord being adapted to convey electricity from a selected source to said electrical heater unit.

10. The shelter in accordance with claim 1, including chock members fixed to said floor portion and upstanding therefrom, said chock members being adapted to receive said automobile wheels to position said automobile portion in said housing.

11. An automobile shelter comprising a housing; said housing including:
a floor portion comprising a flat rigid panel adapted to receive wheels of an automobile,
chock members fixed to said floor portion and upstanding therefrom, said chock members being adapted to receive said automobile wheels to position said automobile,
side portions joined to said floor portion, said side portions being flat rigid panels adapted to extend along each side of an engine compartment of said automobile,
a roof portion comprising a flat rigid panel joined to said side panels and adapted to overlie said automobile engine compartment,
a back portion comprising a flat rigid panel joined to said side panels, said floor panel and said roof panel,
said floor, side and roof panels each being of a length extending from a point forward of, but proximate, a front bumper portion of said automobile to a point proximate the forward extent of a front windshield of said automobile, and
a front portion having an opening therein and being adapted to receive said engine compartment portion of said automobile, said front portion comprising a flexible material mounted on said flat rigid floor, side and roof panels and extending inwardly therefrom, said flexible material being
adapted to be drawn snugly completely around said automobile forward of but proximate the forward extent of said windshield of said automobile, and an electrical heater unit fixed to the interior of said housing on a selected one of said rigid panels and adapted to raise the ambient temperature within said housing, an electrical cord extending from said housing being adapted to convey electricity from a selected source to said electrical heater unit.

* * * * *